March 1, 1960  F. H. MITTAG  2,927,253
ARRANGEMENTS FOR SELECTIVELY ACTUATING CONTROL
DEVICES BY MEANS OF A MOVABLE MAGNET
Filed Sept. 27, 1955  3 Sheets-Sheet 1

Inventor:
FRITZ H. MITTAG
BY
ATTORNEY

March 1, 1960 F. H. MITTAG 2,927,253
ARRANGEMENTS FOR SELECTIVELY ACTUATING CONTROL
DEVICES BY MEANS OF A MOVABLE MAGNET
Filed Sept. 27, 1955 3 Sheets-Sheet 2

*Inventor:*
FRITZ H. MITTAG
BY
ATTORNEY

March 1, 1960 F. H. MITTAG 2,927,253
ARRANGEMENTS FOR SELECTIVELY ACTUATING CONTROL
DEVICES BY MEANS OF A MOVABLE MAGNET
Filed Sept. 27, 1955 3 Sheets-Sheet 3

Inventor:
FRITZ H. MITTAG
BY
ATTORNEY

United States Patent Office 2,927,253
Patented Mar. 1, 1960

2,927,253

ARRANGEMENTS FOR SELECTIVELY ACTUATING CONTROL DEVICES BY MEANS OF A MOVABLE MAGNET

Fritz H. Mittag, Berlin-Friedenau, Germany, assignor to International Standard Electric Corporation, New York, N.Y., a corporation of Delaware Application September 27, 1955, Serial No. 537,020

Claims priority, application Germany October 1, 1954

9 Claims. (Cl. 317—137)

In many cases, in particular with railway systems and transportation or conveying plants, signals must be given from the vehicle or container in motion to stationary equipments. For this purpose a test or sensing device is employed and is positioned near the path or track of the objects to be conveyed. In order to produce signals different from each other, test or sensing devices may be arranged in radial directions with respect to that path and in a plane normal to it. These devices become affected in a manner depending upon the position of a controlling magnet. If a plurality of these test devices are employed, which for instance are situated in a straight line normal to said path, and which are to be affected by a magnet carried on the object of conveyance and displaceable vertically to the axis thereof, then the test device nearest to the magnet will be affected most, but the neighboring test devices cannot be prevented from becoming likewise affected to such an extent as to initiate a control operation. This effect is undesirable in most cases. To lessen or avoid it, the distances between the test devices and between them and the magnet must be suitably dimensioned.

The subject of the invention is an arrangement which is free from the said shortcomings without the test devices having to be spaced apart at distances inconveniently large.

The invention is particularly applicable, for instance, for performing the destination control of dispatch-tube systems, and is described hereafter by way of example, with respect to such a system, reference being had to the accompanying drawings in which.

Figure 1:
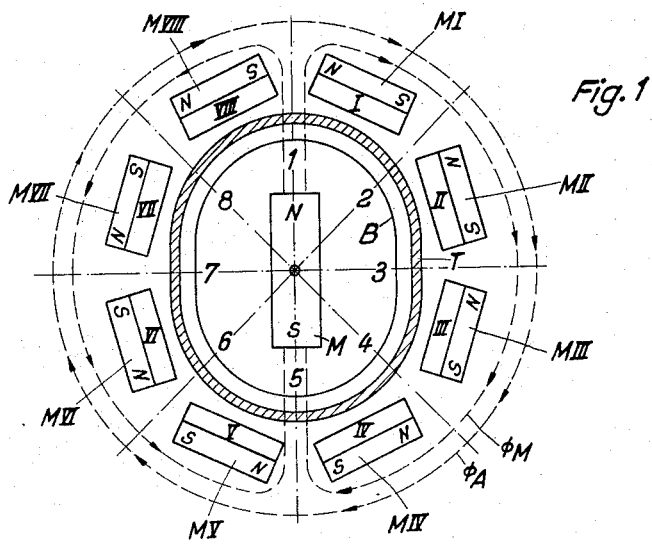
Fig. 1 is a diagrammatic cross-sectional view of a dispatch-tube and a carrier in it, the two being provided with one form of the control equipment according to the invention.

Reverting to Fig. 1, the dispatch carrier B has a magnet M mounted rotatably on one end wall thereof. The test or sensing devices I–VIII form a circular arrangement around the non-ferromagnetic transmission tube T and each comprise a fixedly mounted magnet. These magnets MI–MVIII are arranged with their unlike poles N, S facing each other to constitute a closed magnetic circuit illustrated by the arrowed dashed-line circle ΦA. The magnet M can be given eight angular positions, as denoted by numerals 1–8. When in any one of these positions the magnet M is in coincidence with two diametrically opposite gaps between the magnets MI–MVIII. When the carrier running in tube T passes by the assemblies I, MI; II, MII; III, MIII . . . VIII, MVIII, magnet M affects the magnetic circuit constituted by the magnets MI–MVIII. When in the position shown, this magnet increases the flux in the magnets MI–MIV but decreases the flux in the magnets MV–MVIII, as can be understood from the arrowed magnetic lines of force, ΦA, ΦM of the magnets MI–MVIII and of magnet M, respectively.

Figure 2:
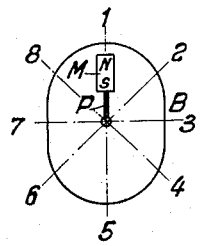
Fig. 2 is a diagrammatic end view of the carrier slightly modified as compared with the construction shown in Fig. 1.

With magnet M in the position shown in Fig. 1, its influence on the devices I, IV is as intense as that on the devices VIII, V. If, however, only one device of either of these two pairs is to be affected, then the magnet M should be arranged as shown in Fig. 2. Here it is mounted on an arm P rotatable about the axis of the carrier B.

Figure 3:
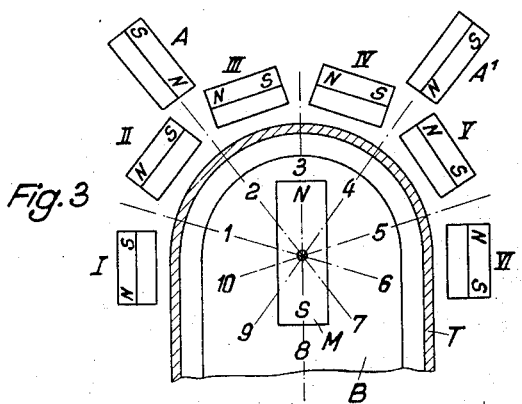
Fig. 3 represents an arrangement similar to that shown in Fig. 1 by comprising additional test or sensing devices.

In special cases, particularly with carriers oblong in cross-section, the test devices may be arranged as represented in Fig. 3, which shows six test devices I–VI, each associated with a magnet as in Fig. 1. Each of the two arcuate wall parts of the tube T may be fitted with such an equipment. In the example shown in Fig. 3, the magnet M can be given any one of ten positions. These are such that either the north pole N or the south pole S of magnet M is facing the gap between the respective magnets of the test devices. The magnet M, Fig. 3, may be set with its north pole N to any one of the positions determined by the numerals 1–8. With the north pole set to any one of the positions 6–10, the south pole S will be in the respective one of the positions 1–5. Two additional test devices A, A', one assigned to the group of test devices I, II, III, the other to the group IV, V, VI, are so situated that their north pole is facing the tube T and will cooperate with the south pole of magnet M whenever this pole is in any one of the positions 1–5. The devices A, A' constitute a change-over equipment that operates as described hereafter. They may be level with the devices I–VI or may be positioned either immediately before or behind them.

Figure 4:
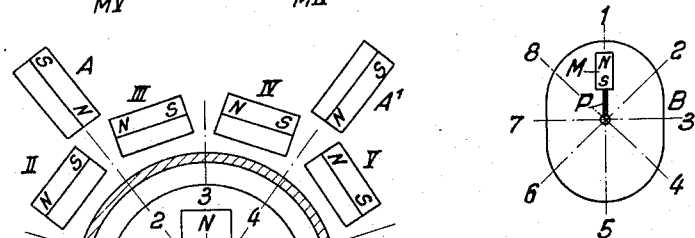
Fig. 4 illustrates an arrangement in which the test devices are arranged in a straight line.

In the arrangement shown in Fig. 4 the test devices I, II, III, IV are arranged in a straight line and the magnet M is displaceable into any one of the positions indicated by the lines 1, 2, 3. Similarly to the arrangement shown in Fig. 1, the magnetic fields are indicated by the arrowed dashed lines ΦA, ΦM. Preferably this arrangement serves to control transportation systems whose transmission path extends at right angles to the plane of the drawing. For instance, the test devices I–IV may be arranged beside a trackway or a railway and at right angles thereto while magnet M is installed in a vehicle therefor. With this magnet in either one or another of the positions indicated by the lines 1, 2, 3, various switching-orders may be initiated by the test devices I–IV to some fixed station. Conversely the devices I–IV may be installed in a vehicle and the magnet M may be arranged beside the track and at right angles to this while being displaceable laterally, whereby it will be possible for switching-orders to be sent from the fixed station to the vehicle in motion.

The invention is thus also useful in connection with conveying systems other than dispatch-tube plants, or with train control systems for railroads. In all these cases each effective position of magnet M is reversible so that the number of possible switch-operations may be doubled as described with reference to Fig. 3.

Figure 5:
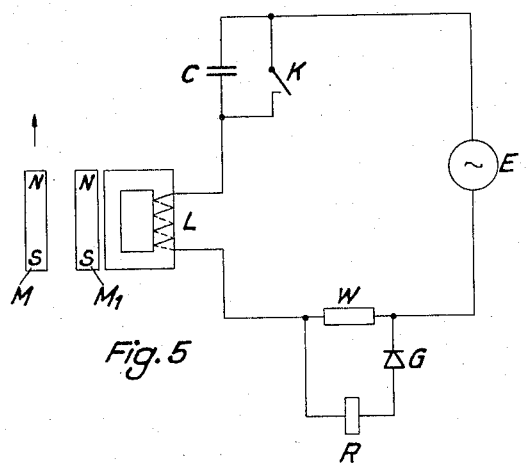
Fig. 5 shows a circuit arrangement of a test device, and also shows a magnet forming part of the carrier.

The test devices I–VIII in Fig. 1, I–VI in Fig. 3, and I–IV in Fig. 4 may be constructed as represented in Fig. 5. Here an iron-core choke L, premagnetized by a permanent magnet M1, is included in an electric oscillatory circuit whose capacity is designated C, and which also contains a resistance W shunted by a relay R in series with a rectifier G. E denotes an alternating-voltage source in this circuit. A magnet M approaching the choke L or passing by it acts to change the inductance of L and thereby to change the potential across resistance W in such manner as to excite relay R.

Magnet M, Fig. 5, is the magnet which in Figs. 1–4 is likewise designated M. Magnet M1, Fig. 5, corresponds to any one of the magnets which in Fig. 1 are denoted by MI–MVIII while in Figs. 3 and 4 they are merely indicated by their north poles N and south poles S. Relay R, Fig. 5, is representative of any one of relays R1–R6 and RA shown in Fig. 6. The devices I–VI and A, A' as shown in Fig. 6 thus each comprise parts equivalent to M1, L, C, E, W, G, Fig. 5.

Figure 6:
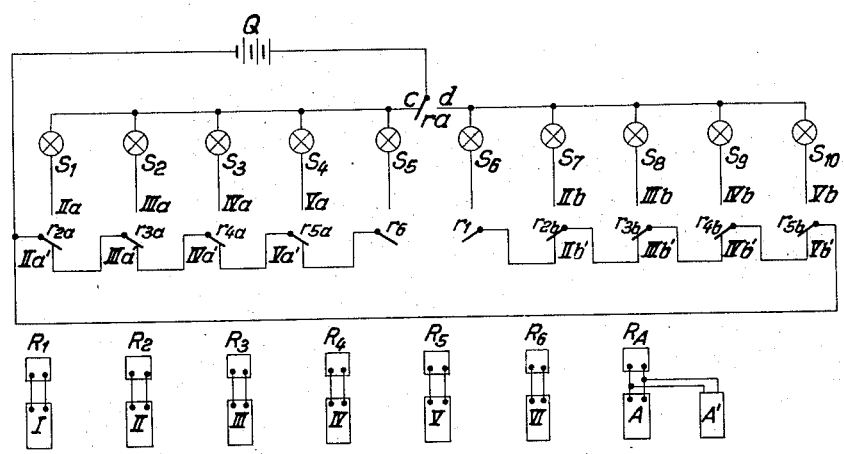
Fig. 6 represents a circuit arrangement of the test devices indicated schematically in Figs. 1, 3, 4.

Fig. 6 also shows the test devices A, A' as connected in parallel with relay RA. The devices A, A' are those represented schematically by the same reference letters in Fig. 3. Fig. 6 thus more particularly illustrates a circuit arrangement for what is shown in Fig. 3, but the features disclosed therein may be readily applied to the arrangements of Figs. 1 and 4 also.

Relay RA has a change-over contact $ra$ comprising a break-contact $c$ and a make-contact $d$. The relays R2–R5 have each two change-over contacts $r2a$, $r2b$; $r3a$, $r3b$; $r4a$, $r4b$; $r5a$, $r5b$, respectively. Relay R1 has a make-contact $r1$, relay R6 a make-contact $r6$. When at normal the contacts $r2a$–$r5a$ have their break-contacts $IIa'$, $IIIa'$, $IVa'$, $Va'$ and the make-contact $r6$ joined in series. Make contact $r1$ and the break-contacts $IIb'$, $IIIb'$, $IVb'$, $Vb'$ are likewise connected in series. The make-contacts $IIa$, $IIIa$, $IVa$, $Va$ of $r2a$–$r5a$ are connected each with a current consuming device S1, S2, S3, S4, respectively. Similarly, contact $r6$ is connected to a current consuming device S5, and contact $r1$ to a current consuming device S6, while the make-contacts $IIb$, $IIIb$, $IVb$ of $r2b$–$r5b$ are connected to current consuming devices S7–S10, respectively. These devices may be electromagnetic means arranged to set routing switches such as those of dispatch-tube systems. When contact $ra$ is at normal, the devices S1–S5 are connected over the break-contact $c$ thereof to a battery Q.

With magnet M positioned as shown in Fig. 3, with its north pole N pointing to the numeral 3, the test devices A, A' will not be affected because the magnetic lines of force emanating from the north poles of A, A' are counteracted by those emanating from the north pole of M. A, A' thus remaining at normal, relay RA remains at rest. The break-contact $c$ of $ra$ hence remains closed. From the magnetic fields illustrated in Fig. 1 by the arrowed dashed lines ΦA, ΦM it appears that in the case of Fig. 3 the magnetic flux of the test devices I, II, III will be attenuated, so these devices will not be affected. This illustration also makes it clear that in the case of Fig. 3 the magnetic flux in the test devices IV, V, VI will be intensified. Accordingly, the relays R4, R5, R6 energize. Their contacts $r4a$, $r5a$, $r6$ are hence switched over, and $r4b$, $r5b$ as well, but the switching of $r4b$, $r5b$ has no effect since the make-contact $d$ of $ra$ is open. The device S3 is thus excited in the circuit Q, $r2a$ ($IIa'$), $r3a$ ($IIIa'$), $r4a$ ($IVa$), S3, $c$, Q. No current is supplied to the devices S4, S5 because the break-contact $IVa'$ of $r4a$ has been opened and also the break-contact $Va'$ of $r5a$. Through this disconnection so accomplished, in exciting the test device IV, the undesired excitation of the neighboring test devices V, VI has been rendered ineffective. None but device S3 will thus be operated to set, for example, the routing switch controlled by it. Similarly, if magnet M is so set that its north pole N points to the numeral 4, its south pole S hence pointing to the numeral 9, then in analogous manner to that indicated by the dashed lines ΦA, ΦM, Fig. 1, the magnetic lines of force emanating from the north pole of M will diverge between the group of test devices I–IV and the group of test devices V, VI. The lines of force passing by the devices I–IV can not affect any one of these because they flow in opposition to the flux designated ΦA in Fig. 1. But the lines of force flowing past the devices V, VI are in the same direction as the flux ΦA and will hence affect these two, with the result that contact $r5a$ of relay R5 is switched over to insert the device S4 and to disconnect the device S5 although relay R6 by closing its contact $r6$ has tried to insert the device S5.

If, however, magnet M is given the position the reverse of that shown in Fig. 3, so that its north pole N is at 8 while its south pole is at 3, then the test devices A, A' become effective since unlike poles are now facing each other, namely, the north poles N of A, A' and the south pole S of M. Relay RA of A, A' hence energizes to open the break-contact $c$ of its change-over contact $ra$ and to close the make-contact $d$ thereof. With magnet M in that position, the magnetic flux emanating from the north pole of M and entering the south pole thereof, is of the same direction as that of the magnets pertaining to the test devices I, II, III. These will hence be excited, but the test devices IV, V, VI remain unaffected since here the two fluxes counteract each other. An illustration of these fluxes can be obtained by turning Fig. 1 through an angle of 180°, the fluxes being here represented by the arrowed dashed line ΦA, ΦM. The devices I, II, III thus excited energize their relays R1, R2, R3. Accordingly the contacts $r1$, $r2a$, $r2b$, $r3a$, $r3b$ of these are switched over. The switching of the contacts $r2a$, $r3a$ has no effect because the battery Q has been disconnected from them by break-contact $c$ having been opened as described. It is in this sense that the test devices A, A', controlling the relay RA, act as a change-over equipment. Through the switching of contact $r3b$ the device S8 is excited in the circuit Q, $r5b$ ($Vb'$), $r4b$ ($IVb'$), $r3b$ ($IIIb$), S8, $d$, Q to set a predetermined routing switch, for example. The consumers S6, S7 are not operated because the break-contact $IIIb'$ of $r3b$ now open has switched them out of circuit with battery Q.

Figure 7:
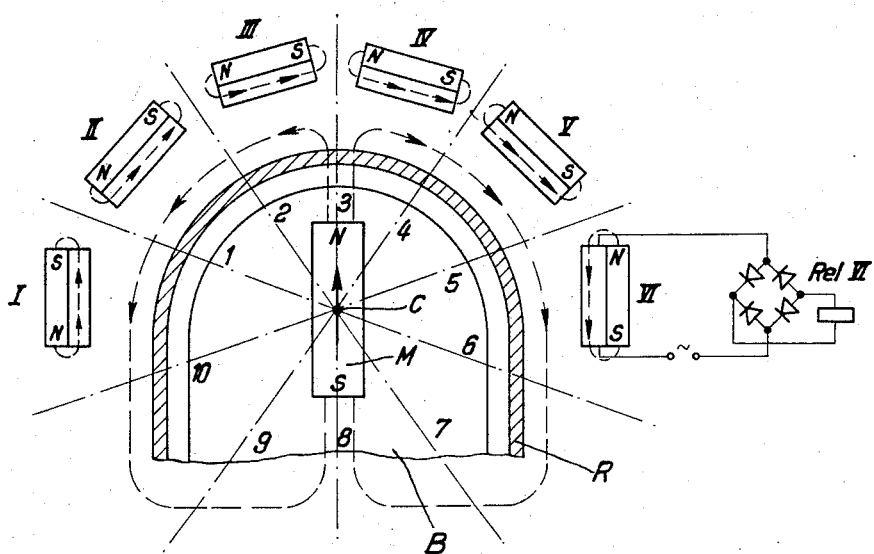
Fig. 7 illustrates an arrangement similar to that of Fig. 3 but with the additional test devices A, A' omitted.

In Fig. 7, B denotes a dispatch container or carrier guided in a non-ferromagnetic transmission tube R in a direction normal to the plane of the drawing. In a plane normal to a longitudinal axis C of tube R, test or so-called scanning devices I–VI are arranged in a semi-circle around tube R, but these devices may be in any other suitable position. For instance, they may be arranged horizontally. By their aid, destination indicating means on the dispatch carriers are rendered effective to operate control devices arranged to set routing switches. The devices I–VI are situated along a line which as here shown by way of example is semi-circular, and are positioned at certain distances apart with their unlike poles N, S facing each other. Magnet M is mounted either on an end face or on the circumferential surface of the dispatch carrier in a manner to be rotatable or displaceable on it. In the example here represented the magnet M has its north pole N turned toward the gap between the devices III, IV. The arrow on it indicates the respective control position, that is, position 3 in the case here illustrated. Magnet M can be so set that either its north pole N or its south pole S will face the gap between the two respective neighboring devices I–VI. The devices I–VI are associated with magnets that impart to them the requisite polarization. Whenever the field of magnet M is caused to affect the field of these magnetic devices, then the latter field will be either intensified or reduced in intensity, this effect depending upon the polarities of the cooperating fields. In the example of Fig. 7 the devices I, II, III will be reduced in intensity of their effect whereas the devices IV, V, VI will be intensified.

Preferably the magnetically sensitive devices comprise iron-core chokes whose coils are each included in an electric circuit. When the inductivity of the respective choke is varied, its electric circuit becomes unbalanced or otherwise affected, the resulting variation of the closed-circuit current in this circuit causing a relay to respond. These circuits are so connected that in a group any circuit thereof excited first will render ineffective the control action of the ensuing circuits. In the case illustrated by way of example, the circuits of the devices IV, V, VI are excited, but those of the devices V, VI are rendered ineffective because they become opened by relays included in the circuits of IV and V, respectively.

Such is the operation whenever the devices I–VI are affected by the north pole N or magnet M. The possibilities of switch may be doubled by also employing the south pole S as a control means, a separate device being arranged to cooperate with the respective one of the devices I–VI. In this case, with magnet M turned through 180°, the devices I, II, III would be excited, but the circuit of device I would break the circuits of the devices II, III. Accordingly, the control action would be accomplished by device I and would thus be wrong since the aim is to have the control action performed by device III, magnet M having been so positioned that its south pole S is facing the gap between III and IV.

To remedy this defect in Fig. 3 one or two magnetic devices A, A' are arranged to afford an additional control action.

Figure 8:
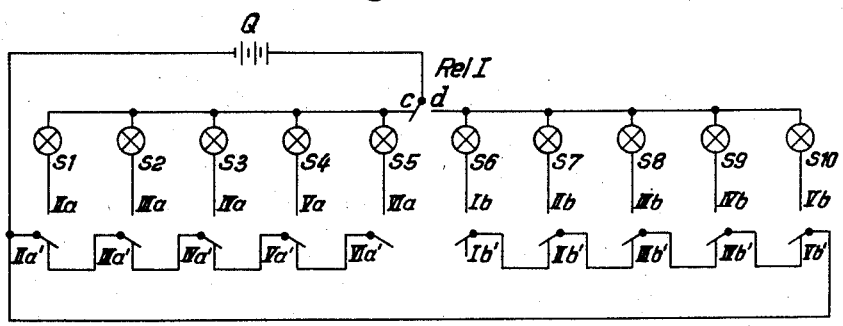
Fig. 8 shows a circuit arrangement for the modified device of Fig. 7.

In the arrangement of Figs. 7 and 8 such additional devices are saved, their office being performed by one of the devices already existing in the arrangement.

Each of the devices I–VI is associated with a relay controlled by it and arranged as shown for device VI, whose relay is designated RelVI, Fig. 7. Accordingly, the relays of I–V are spoken of as RelI–RelV. RelI of the end device I is represented by a change-over contact constituted by a break-contact $c$ and a make-contact $d$, Fig. 8. Alternatively this change-over contact may be a contact of RelVI of the other end device, that is, of device VI. The circuit over break-contact $c$ contains the control devices S1–S5 which correspond to the control positions 1–5 of magnet M, which are indicated by radial dash-and-dot lines in Fig. 7. In the circuit that can be completed by make-contact $d$ the control devices S6–S10 corresponding to the control positions 6–10 of magnet M are included. The relays RelII–RelVI have make-contacts IIa–VIa and break-contacts IIa'–VIa'. The relays RelI–RelV also have make-contacts Ib–Vb and break-contacts Ib'–Vb'. By the change-over contact $c$, $d$ the control devices S1–S10 are divided into a group of S1–S5 and a group S6–S10. The make-contacts IIa–VIa and Ib–Vb are each contained in the circuit of a definite one of the control devices S1–S10. The break-contacts IIa'–VIa' are joined in series in the group S1–S5. The break-contacts Ib'–Vb' are serially connected in the group S6–S10. Q denotes a D.C. source.

The arrangements of Figs. 7 and 8 operates as follows:

With magnet M in the position represented in Fig. 7, RelI, that has only its change-over contact $c$, $d$ shown, has not energized since the magnetic lines of force of device I are contrary in direction to those of magnet M, as is indicated by the arrows in Fig. 7. Accordingly, break-contact $c$ has been closed. Of the relays RelI–RelVI, only RelIV, V, VI have energized, because the magnetic lines of force of the devices IV, V, VI correspond in direction with those of magnet M. Current hence flows over control appliance S3 and make-contact IVa back to the voltage source Q. RelV and RelVI although energized, having thus closed their contacts Va, VIa, can not insert S4, S5 since the break-contact IVa' has been opened and has thus disconnected the appliances S4, S5 from the voltage source Q.

If magnet M is in position 4, the path of the lines of force is such that only the devices V, VI will be affected, so none but RelV and RelVI will respond. RelV by means of its contact Va inserts the control device S4. By break-contact Va' of RelV the control device S5 is disconnected. The fact that RelVI has closed its contact VIa will thus be ineffective. As with contact $c$ closed the control devices S6–S10 are out of circuit connection with the voltage source Q, the switching of any one of the contacts Ib–Vb and Ib'–Vb' will be without effect.

Magnet M is rotatable through 360°. If this magnet is turned through 180°, its pole N thus being brought to assume the position 8, or if it is turned somewhat farther, then in any case the device I will be excited since the lines of force passing by this device are now of the same direction as those emanating from it. Accordingly, RelI responds in order to open contact $c$ and close contact $d$. Contact $c$ thus disconnects the voltage source Q from the control devices S1–S5, so any switching of the contacts IIa–VIa, IIa'–VIa' will be ineffective. But RelIII energizes to close its contact IIIb and thereby to insert the control device S8 over the break-contacts IVb', Vb'. Contact IIIb' of RelIII opens to disconnect the control devices S6, S7 from the voltage source Q, so the device S8 alone shall perform a control action.

The possibilities of switching depend in number on that of the sensing devices employed, here shown as six devices I–VI. In any case the largest number of such possibilities is double the number of the sensing devices less one.

While I have described above the principles of my invention in connection with specific apparatus, it is to be clearly understood that this description is made only by way of example and not as a limitation to the scope of my invention.

What is claimed is:

1. A system for selectively actuating control devices located along a vehicular path comprising in combination, a vehicle adapted to travel along said path, said vehicle having a magnet movably mounted thereon in a manner to permit orientation thereof in a plane at right angles to the longitudinal axis of said vehicle, a system of fixed magnets disposed adjacent said path side by side and along a given curve and in a common plane which is normal to the longitudinal axis of said path, said fixed magnets positioned with the unlike poles of adjacent magnets facing each other and spaced apart to form gaps a distance sufficiently small to constitute a flux loop extending from magnet to magnet around the system, a plurality of magnetic field sensing means located in the magnetic fields of said fixed magnets, respectively, means for selectively moving the magnet on said vehicle so that at least one pole thereof may face the gap between any pair of adjacent fixed magnets in said system, and control means coupled to said field sensing means and responsive thereto, the magnet on said vehicle adapted to affect the flux loop around said system at any gap which its said pole faces whereby to cause operation of the control means associated with one of the fixed magnets which defines said gap.

2. A system according to claim 1, further comprising additional fixed magnets and sensing means located in said plane for varying the control effect of the other fixed magnets and sensing means responsive to a decrease or increase of the magnetic flux due to the influence of said magnet on said vehicle.

3. A system according to claim 1, wherein said field sensing means comprise iron-core chokes premagnetized by the magnetic fields of the respective fixed magnets.

4. A system as claimed in claim 1, wherein said given curve is substantially circular.

5. A system as claimed in claim 1 wherein said fixed magnets are divided into two groups and further comprising a control circuit for each of said magnetic field sensing means, a change-over switch coupled to said control circuits for rendering operative one or the other of the two groups of control circuits, and actuating means responsive to one or other of the two fixed magnets constituting the ends of said groups for actuating said change-over switch.

6. A system as claimed in claim 5, in which said actuating means comprises a source of operating potential, a relay for each of said fixed magnets, each relay having two sets of make and break contacts, an additional relay under control of said change-over switch, said additional relay having make and break contacts, a first signal circuit including break contacts of said additional relay and the make contacts of said first set, an additional signal circuit including the make contacts of said additional relay and the make contacts of said second set, the movable contacts of the relays at the respective ends of said magnet groups both connected to a first terminal of said source, and the movable contact of said additional relay connected to the other terminal of said source, a pair of series circuits for each contact set, each circuit extending from the movable contact in each relay to the back contact of the adjacent relay in the same set.

7. A system as claimed in claim 6, wherein said fixed magnets are arranged along a semi-circular line about said path.

8. A system as claimed in claim 7, wherein said magnet on said vehicle is pivotally mounted to rotate through 360° within the circle formed by said fixed magnets and about the center point thereof.

9. A system as claimed in claim 5, in which said sensing means each comprise a choke having its core included in a magnetic circuit and its coil included in an electric circuit, in which said coil functions as a variable impedance.

References Cited in the file of this patent
UNITED STATES PATENTS

| | | |
|---|---|---|
| 1,679,390 | Wooding | Aug. 7, 1928 |
| 1,797,864 | Harlandt | Mar. 24, 1931 |
| 2,522,815 | Early | Sept. 19, 1950 |
| 2,761,962 | Hughson | Sept. 4, 1956 |
| 2,815,182 | Mittag | Dec. 3, 1957 |

FOREIGN PATENTS

| | | |
|---|---|---|
| 119,909 | Australia | Apr. 30, 1945 |
| 878,774 | Germany | June 5, 1953 |